(12) United States Patent  (10) Patent No.: US 8,500,104 B2
Spears et al.  (45) Date of Patent: Aug. 6, 2013

(54) PRESSURIZED LIQUID STREAM WITH DISSOLVED GAS

(76) Inventors: James Richard Spears, Bloomfield Hills, MI (US); James W. Ridgway, Grosse Pointe Park, MI (US)

(*) Notice: Subject to any disclaimer, the term of this patent is extended or adjusted under 35 U.S.C. 154(b) by 447 days.

(21) Appl. No.: 12/795,362

(22) Filed: Jun. 7, 2010

(65) Prior Publication Data

US 2011/0301531 A1  Dec. 8, 2011

(51) Int. Cl.
 *B01F 3/04* (2006.01)
(52) U.S. Cl.
 USPC ......... 261/28; 261/77; 261/119.1; 261/121.1; 239/9
(58) Field of Classification Search
 USPC ............... 261/28, 37, 77, 78.2, 115, 119.1, 261/122.1, 121.1; 239/9, 10
 See application file for complete search history.

(56) References Cited

U.S. PATENT DOCUMENTS

| | | | |
|---|---|---|---|
| 2,588,677 A * | 3/1952 | Welty et al. | 261/27 |
| 3,291,463 A * | 12/1966 | Rousseau et al. | 261/100 |
| 3,850,753 A | 11/1974 | Chibata et al. | |
| 3,956,124 A | 5/1976 | Fast et al. | |
| 4,664,680 A | 5/1987 | Weber | |
| 4,735,750 A | 4/1988 | Damann | |
| 4,906,387 A | 3/1990 | Pisani | |
| 4,990,260 A | 2/1991 | Pisani | |
| 5,139,663 A | 8/1992 | Maples | |
| 5,152,923 A | 10/1992 | Weder et al. | |
| 5,326,468 A | 7/1994 | Cox | |
| 5,374,358 A | 12/1994 | Kaniecki et al. | |
| 5,393,417 A | 2/1995 | Cox | |
| 5,407,426 A | 4/1995 | Spears | |
| 5,494,585 A | 2/1996 | Cox | |
| 5,569,180 A | 10/1996 | Spears | |
| 5,735,934 A | 4/1998 | Spears | |
| 5,797,874 A | 8/1998 | Spears | |
| 5,904,121 A | 5/1999 | Mezheritsky et al. | |
| 5,951,921 A * | 9/1999 | Koganezawa et al. | 261/36.1 |
| 5,961,895 A * | 10/1999 | Sanford | 261/36.1 |
| 6,200,486 B1 | 3/2001 | Chahine et al. | |
| 6,221,260 B1 | 4/2001 | Chahine et al. | |
| 6,241,802 B1 | 6/2001 | Spears et al. | |
| 6,315,942 B1 | 11/2001 | Spears et al. | |
| 6,344,489 B1 | 2/2002 | Spears | |
| 6,676,900 B1 | 1/2004 | Divino, Jr. et al. | |

(Continued)

FOREIGN PATENT DOCUMENTS

| | | |
|---|---|---|
| DE | 202006002983 U1 | 4/2006 |
| EP | 2116589 A1 | 11/2009 |
| WO | WO-2006109043 A1 | 10/2006 |

OTHER PUBLICATIONS

Attard, Phil, et al., "Nanobubbles: the big picture," Physica A 314, pp. 696-705 (Nov. 2002).

(Continued)

*Primary Examiner* — Charles Bushey
(74) *Attorney, Agent, or Firm* — Harness, Dickey & Pierce, PLC

(57) ABSTRACT

A system and method of injecting a gas enriched and/or emulsified first liquid into a second liquid is disclosed. The injection can cause generation of a high density of bubbles having a mean diameter of a selected size. The mean diameter of the bubbles can be selected and varied based on the characteristics of the injection system.

22 Claims, 8 Drawing Sheets

U.S. PATENT DOCUMENTS

| | | | |
|---|---|---|---|
| 6,689,262 | B2 | 2/2004 | Senkiw |
| 7,008,535 | B1 | 3/2006 | Spears et al. |
| 7,247,244 | B2 | 7/2007 | Kozyuk |
| 7,255,332 | B2 | 8/2007 | Osborn et al. |
| 7,294,278 | B2 | 11/2007 | Spears et al. |
| 7,578,942 | B2 | 8/2009 | Yamasaki et al. |
| 7,591,452 | B2 | 9/2009 | Kohama et al. |
| 7,628,912 | B2 | 12/2009 | Yamasaki et al. |
| 7,631,615 | B1 | 12/2009 | Mast |
| 7,641,798 | B2 | 1/2010 | Yamasaki et al. |
| 7,641,802 | B2 | 1/2010 | Yamasaki et al. |
| 7,670,493 | B2 | 3/2010 | Bolam |
| 7,670,495 | B2 | 3/2010 | Senkiw |
| 7,802,775 | B2 * | 9/2010 | Emilsen et al. ............ 261/76 |
| 7,874,546 | B2 | 1/2011 | Park |
| 8,292,194 | B2 * | 10/2012 | Blechschmitt et al. ......... 239/8 |
| 2003/0183584 | A1 * | 10/2003 | Galatro et al. ............ 210/760 |
| 2005/0279713 | A1 | 12/2005 | Osborn et al. |
| 2008/0277329 | A1 | 11/2008 | Zhang et al. |
| 2009/0051055 | A1 | 2/2009 | Park |

OTHER PUBLICATIONS

Azo Nanotechnology, "BluePlanet Licenses its Micro Nano Bubble Water Ozonation Technology to Pool Manufacturer," Retrieved from URL http://www.azonano.com/news.asp?newsID=16325 on Mar. 13, 2010 pp. 1-2 (posted on Mar. 9, 2010).

Azo Nanotechnology, "NanoParticle Tracking Analysis (NTA) and Dynamic Light Scattering (DLS)—Comparison Between NTA and DLS by Nanosight," Retrieved from http://www.azonano.com/details.asp?ArticleID=2274 on Jan. 21, 2010, pp. 1-7.

Bete Nozzles for Industry, Pollution Control and Fire Protection Brochure Copyright 2005 pp. 22-23, 76, 82-88, and 117.

Brereton, G.J., et al. "Nucleation in small capillary tubes," Chemical Physics 230 ( May 1998) pp. 253-265.

Bunkin, N. F., et al., Abstract and First Page of "Cluster Structure of Stable Dissolved Gas Nanobubbles in Highly Purified Water," SpringerLink pp. 1-2 (Jun. 19, 2009).

Chakinala, Anand; et al., "Industrial Wastewater Treatment Using Hydrodynamic Cavitation and Heterogeneous Advanced Fenton Processing," Chemical Engineering Journal 152 (Oct. 2009), pp. 498-502.

Chaplin, Martin, "Water Structure and Science: Nanobubbles," pp. 1-4 (Nov. 6, 2009).

Cho, Sung-Ho, et al., "Ultrasonic formation of nanobubbles and their zeta-potentials in aqueous electrolyte and surfactant solutions," Colloids and Surfaces A: Physicochem. Eng. Aspects 269, pp. 28-34 (Aug. 16, 2005).

Creech, J. et al. "Injection of Highly Supersaturated Oxygen Solutions Without Nucleation," Journal of Biomechanical Engineering, pp. 676-683, v. 124 (Dec. 2002).

D & K Consulting Group, "Environmental Product Profiles CAV-OX® Advanced Oxidation System," pp. 1-4 (May 9, 1997).

Dorobantu, Loredana S., et al., "Stabilization of Oil-Water Emulsions by Hydrophobic Bacteria," Applied and Environmental Microbiology, vol. 70(10) pp. 6333-6336, (Oct. 2004).

Dupre, V., et al., "Bubble Formation by Water Release in Nozzles—I. Mechanisms," Wat. Res. vol. 32, No. 8, pp. 2491-2497, (Sep. 1998).

Dynaflow, Inc., "DynaJets® Jet Technology," Retrieved from URL http://www.dynaflow.inc.com/Products/Jets/Jets.htm, pp. 1-3 (Last Updated Mar. 11, 2010).

Dynaflow, Inc., "Jet Oxidation Oxidation and Disinfection using Hydrodynamic Cavitation," retrieved from URL www.dynaflow-inc.com/Products/Jets/JetOxidation_files/JetOxidation.htm, pp. 1-3 (Last Updated Mar. 11, 2010).

Edmonds, Peter; et al., "Evidence for Free Radical Production by Ultrasonic Cavitation in Biological Media," Ultrasound in Med. & Biol., vol. 9, No. 6, pp. 635-639 (Nov.-Dec. 1983).

Gogate, P., et al., "A Review of Imperative Technologies for Wastewater Treatment I: Oxidation Technologies at Ambient Conditions," pp. 501-551, Advances in Environmental Research 8 (Mar. 2004).

Goode, Barbara, "Light-Scattering Method Enables Understanding of Nanobubble Formation, Behavior," Media for Laser Focus World, Retrieved from URL http://www.optoiq.com/index/photonics-technologies-applications/lfw-display/lfw-articles-. . . , on Jan. 21, 2010, pp. 1-2 (Jun. 2009).

International Search Report and Written Opinion mailed Sep. 2, 2011 for PCT/US2011/039091 filed Jun. 3, 2011, claiming benefit of U.S. Appl. No. 12/795,362, filed Jun. 7, 2010.

Ishida, Naoyuki, et al., "Nano Bubbles on a Hydrophobic Surface in Water Observed by Tapping-Mode Atomic Force Microscopy," Langmuir, V. 16, pp. 6377-6380 (May 24, 2000).

Jackson, Melbourne, "Energy Effects in Bubble Nucleation," First page only, Ind. Eng. Chem. Res, (Apr. 1994).

Jin, Elvin, "Development of an Appropriate Air Nozzle and Air Saturator for the Dissolved Air Flotation as a Solid-Liquid Separation Process in Potable Water Treatment," Universiti Sains Malaysia, Thesis, pp. 1-24, (Dec. 2004).

Kikuchi, Kenji, et al., "Concentration Determination of Oxygen Nanobubbles in Electrolyzed Water," Journal of Colloid and Interface Science 329, 306-309 (Jan. 2009).

Lide, David, "CRC Handbook of Chemistry and Physicis a Ready-Reference Book of Chemical and Phsyical Data," 86th Edition, Taylor & Francis Group, p. 2-47 (Jun. 2005).

Nanosight, "Nanoparticle Tracking Analysis," Retrieved from URL http://en.wikipedia.org/wiki/Nanoparticle_tracking_analysis, Retrieved on Jan. 21, 2010.

Nanosight, "Visualizing, Sizing and Counting Nanobubbles Using Instruments from NanoSight," pp. 1-6 Date added Dec. 22, 2009.

NanoSpa Systems Brochure "World's First Nanobubble Generator for the Spa, Healthcare and Sports Markets," Retrieved from URL http://www.nanospasystems.com/product/2008/07/worlds-first--1.html on Mar. 16, 2010.

Ohgaki, Kazunari, et al., "Physicochemical approach to nanobubble solutions," Chemical Engineering Science, V. 65, pp. 1296-1300 (Feb. 2010).

Rashed, I., et al., "Overview on Chemical Oxidation Technology in Wastewater Treatment," pp. 115-132, Ninth International Water Technology Conference, IWTC9 (Mar. 2005), Sharm EI-Sheikh, Egypt.

Riverforest Corporation "Micro-Nano Bubble Generator Model: AS-MK III," Brochure, Designed and Produced in Japan by Asupu Company Limited, pp. 1-3, Jun. 2012.

Rodrigues, Rafael, et al., "DAF-Dissolved Air Flotation: Potential Applications in the Mining and Mineral Processing Industry," Int. J. Miner. Process. 82, pp. 1-13 (Feb. 2007).

Ross, Charles, et al., "Rethinking Dissolved Air Flotation (DAF) Design for Industrial Pretreatment," (Apr. 2000) WEF and Purdue University Industrial Wastes Technical Conference, pp. 1-14.

Sivakumar, Manickam; et al., "Wastewater Treatment: A Novel Energy Efficient Hydrodynamic Cavitational Technique," Ultrasonics Sonochemistry 9, pp. 123-131 (Jul. 2002).

Suslick, K., et al. "Chemistry Induced by Hydrodynamic Cavitation," pp. 9303-9304, v. 119 J. Am. Chem. Soc. (Oct. 1997).

Takahashi, Masayoshi; et al., "Free-Radical Generation from Collapsing Microbubbles in the Absence of a Dynamic Stimulus," J. Phys. Chem. B., Abstract only pp. 1-2 (Jan. 25, 2007).

The Free Library, "Royal Electric Releases Ozone Micro-Nano Bubble Water Sterilizer," Retrieved from URL http://www.thefreelibrary.com/Royal+Electric+Releases+Ozone+Micro+Nano+Bubble+Water . . . on Mar. 13, 2010 (Feb. 5, 2007).

Tyrrell, James, et al., "Images of Nanobubbles on Hydrophobic Surfaces and Their Interactions," Physical Review Letters, vol. 87, No. 17, pp. 176104-1-176104-4 (Oct. 22, 2001).

Vlyssides, Apostolos, et al., "Bubble Size Distribution Formed by Depressurizing Air-Saturated Water," Abstract only, Ind. Eng. Chem. Res. (Apr. 22, 2004).

Xiaodong, Zhang, et al., "The Collapse Intensity of Cavities and the Concentration of Free Hydroxyl Radical Released in Cavitation Flow," Chinese Journal of Chemical Engineering, 16(4), 547-551, (Sep. 2008).

Zhang, Xue, et al., "Nanobubbles at the Interface Between Water and a Hydrophobic Solid," Langmuir, Abstract Only pp. 1-2 (Mar. 27, 2008).

Zlokarnik, Marko, "Separation of Activated Sludge From Purified Waste Water by Induced Air Flotation (IAF)," Wat. Res. vol. 32, No. 4, pp. 1095-1102, (Apr. 1998).

* cited by examiner

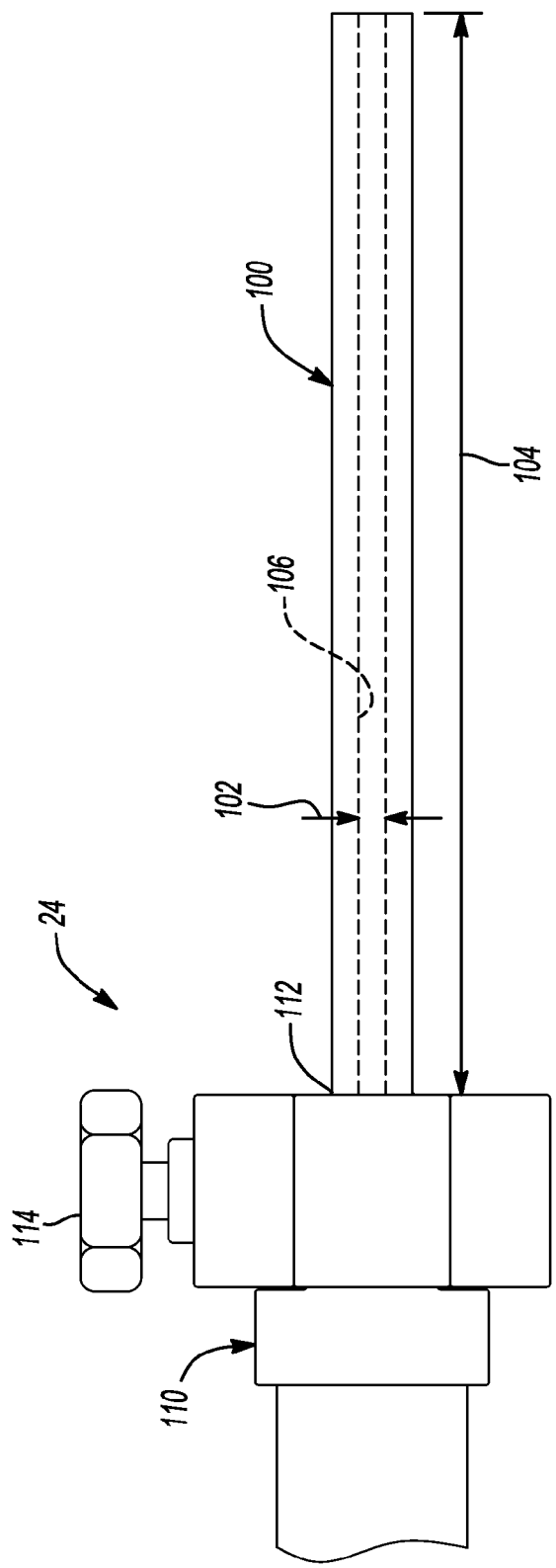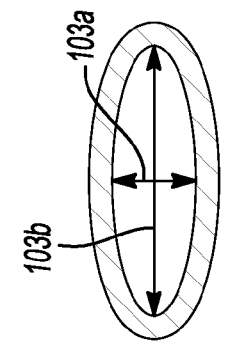

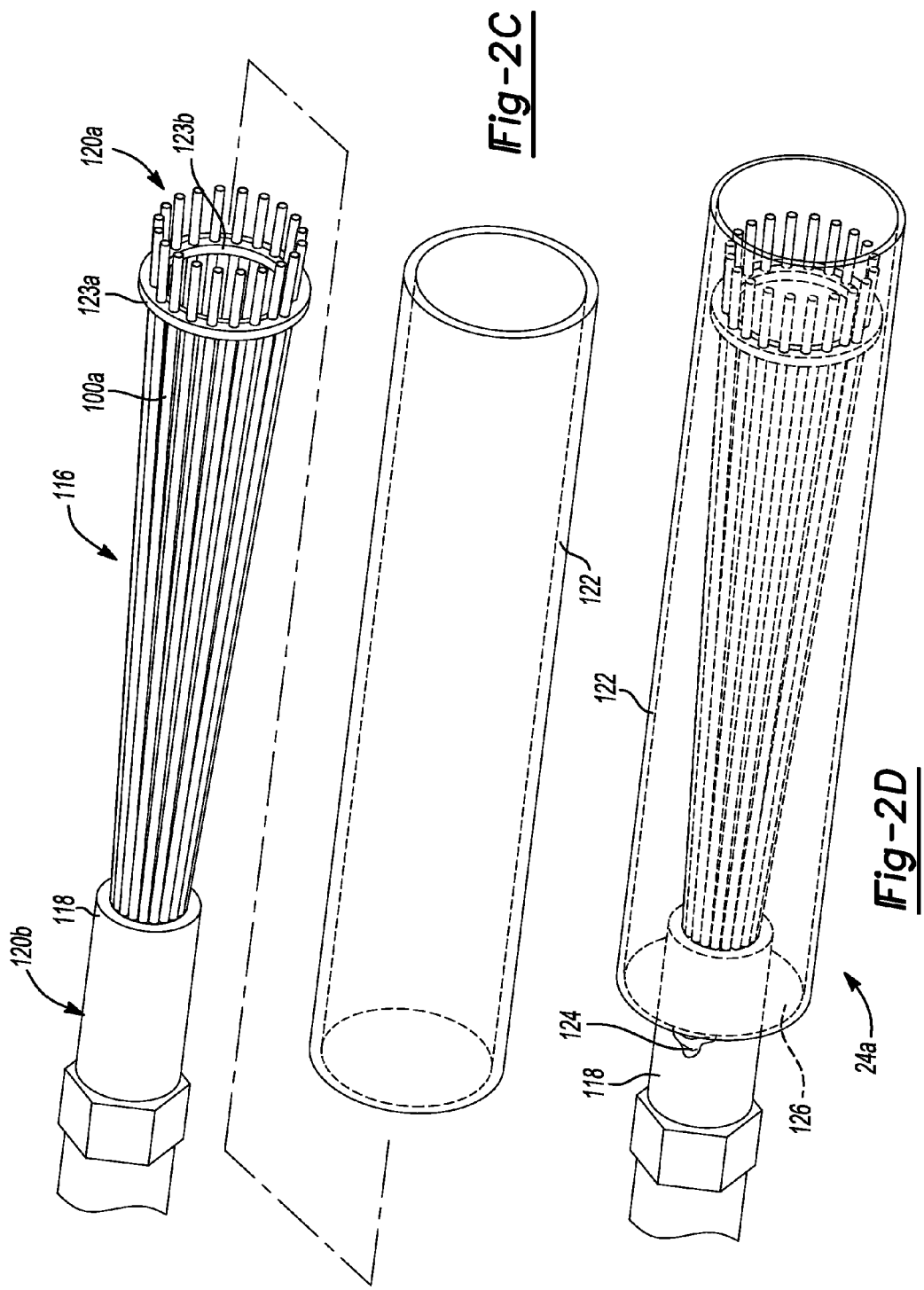

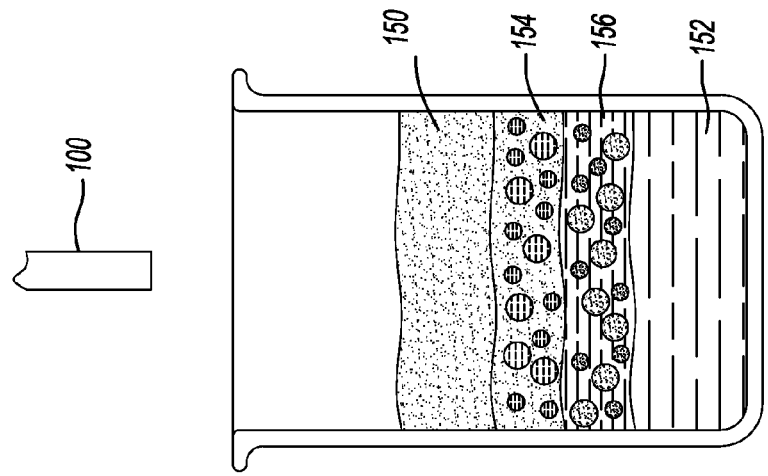
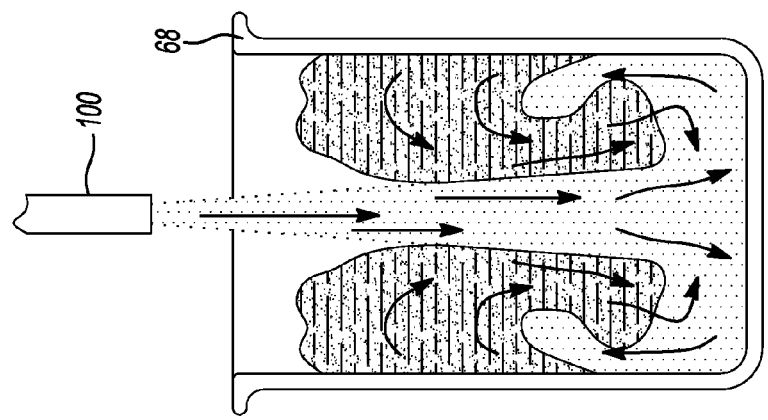
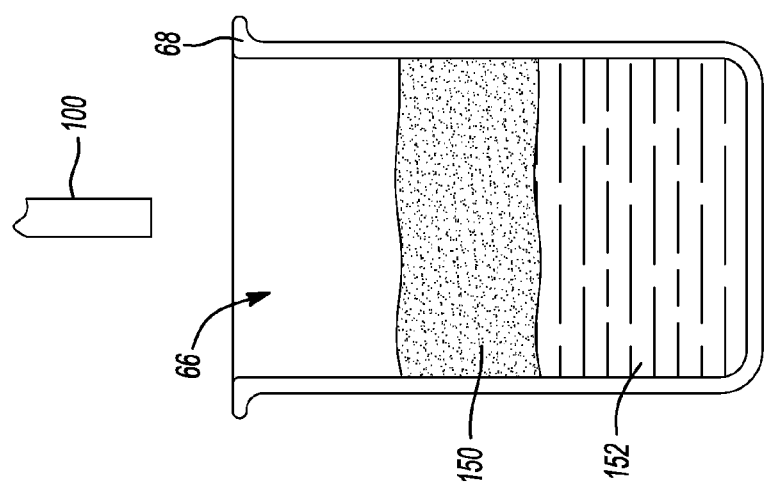

PRESSURIZED LIQUID STREAM WITH DISSOLVED GAS

FIELD

The present disclosure relates to pressurizing a liquid, and particularly to pressurizing an aqueous fluid with a gas to dissolve gas in the liquid for generating a stream of the liquid including small bubbles.

BACKGROUND

This section provides background information related to the present disclosure which is not necessarily prior art.

In providing flow of a liquid, such as water, that is highly supersaturated with a gas such as oxygen, within a host liquid, it has been found that the level of liquid flow rates that ensure laminar flow through small bore tubes is critical for providing bubble-free delivery of the liquid. For example, water that is supersaturated with oxygen at 1 ml $O_2$/g water (at standard temperature and pressure, upon release of the dissolved gas) can be delivered through a silica tubing 100 microns or less in diameter within host liquids without bubble formation, for liquid flow rates of about 1 ml per minute. This flow rate allows for a flow that is laminar, and does not include any cavitation or nucleation sites for formation of bubbles. Such a system is disclosed in U.S. Pat. No. 5,569,180 to Spears. Such a system allows for the injection of the oxygen supersaturated liquid without the generation of bubbles into a system that is sensitive to the introduction of bubbles or other non-fully dissolved gases. Such sensitive systems include the human body in particular the vasculature system within the human body.

Such a system that introduces a substantially bubble-free liquid into a host liquid, such as an intravascular space, does not permit generation of bubbles during rapid dilution (for example, less than about 2-3 bars equilibrium oxygen partial pressure upon mixing) in the host liquid. The tubes for such systems are designed to eliminate heterogeneous nucleation sites along the inner surface of the tubes and at the proximal and distal ends of the tubes.

SUMMARY

This section provides a general summary of the disclosure, and is not a comprehensive disclosure of its full scope or all of its features.

According to various embodiments, a method of treating a receiving volume of a first liquid with a transfer fluid is disclosed. A first fluid can be pressurized with a gas to saturate or create an emulsion of the first fluid and the gas to form the transfer fluid. The pressure can be at least 6 bar in a containment vessel. The transfer fluid can be released from the containment vessel and the released transfer fluid is passed through a tube or series of tubes.

Various Reynolds numbers in the effluent from the tube in a range from about 2,220 to about 100,000 can be achieved. These Reynolds numbers can be achieved by varying any aspect that may change the Reynolds number. Reynolds number is generally defined as a dimensionless number $Re=\rho vl/\eta$, where $\rho$ is density, $v$ is velocity, $l$ is length, and $\eta$ is viscosity (CRC Handbook of Chemistry and Physics, $86^{th}$ Ed., Taylor & Francis, p. 2-47, (2005)). Each of the variables can be altered by materials selected, shape of the tube and/or outlet, etc. The released transfer fluid can generate a dense population of micro-nanobubbles from the tube with the generated Reynolds number having an average diameter that is about 50 microns or less in the receiving volume of the first liquid. The size of the micro-nanobubbles can be altered by selecting a Reynolds number and the Reynolds number can be altered by varying one of the elements of the Reynolds number calculation.

The present disclosure relates to pressurizing a liquid in the presence of a gas to form an emulsion of liquid and dissolved gas and referred to herein as a transfer liquid or fluid. The liquid can be water, either pure or with contaminates. The transfer fluid can be delivered into a second fluid at standard temperature and pressure in a manner that forms a very high density of very small bubbles of a predictable size but does not allow the gas to escape the second liquid quickly.

A transfer fluid is provided that may be a liquid, such as water, that is supersaturated with oxygen or other gas for transfer of the gas to a second volume of liquid and generation of bubbles within the second volume of liquid. The bubbles can be formed due to turbulence of the mixing, phase change of the gas in the transfer fluid, and incipient cavitation (growth of gas nuclei and growth of nanobubbles) in the transfer tube. Additionally, as discussed herein, the bubbles can be formed to include a diameter generally in a range of less than about 50 microns. Furthermore, the bubbles can have a diameter of less than about 20 microns. At least a portion of the bubbles can have a diameter less than 1 micron and generally in a diameter of many nanometers. Such bubbles are referred to herein as micro-nanobubbles.

The bubbles can be used to oxygenate or transfer a selected gas to a second body, such as a pool of water or slip stream of liquid, to oxygenate the second body. Additionally, the transfer fluid, which has a selected saturation or partial pressure of gas, can be used to transfer the gas to the second body. The small bubbles can be selected to be sufficiently small to maintain the selected gas in the second body without quickly or immediately rising to the surface and popping or expanding into the atmosphere. Accordingly, the selected gas can be maintained within the selected body for appropriate purposes.

The body can include a contaminate material or a collection of contaminated materials that are selected to be removed or degraded. An appropriate enzyme, microbe or bio-nutrient can be introduced into the pool or receiving volume of fluid that uses or enhances aerobic respiration in its lifecycle. Accordingly, a high concentration of oxygen can be used to assist in enhancing the speed of the lifecycle and bioactivity of the microbe. The transfer fluid saturated to a selected point with oxygen or air and injected into the receiving body to generate the formation of the bubbles allows access the oxygen source by the microbes. The microbes can then perform the breakdown or degradation of contaminate material within the receiving body for a selected purpose.

The transfer fluid can also be substantially pressurized with the selected gas, including air or oxygen, and exit a nozzle at a selected velocity and flow rate. The density of the transfer fluid exiting the nozzle can include a selected density that is substantially equivalent to a density of the transfer fluid leaving the supply vessel. The elevated velocity exiting the nozzles can serve to introduce the location of bubble formation to the surface of contaminated materials. Accordingly, the pressurized transfer fluid can be used to emulsify the transfer fluid within the receiving fluid, such as water. The pressurized transfer fluid can be used to abrade a surface to remove a material from the surface. Additionally, the small bubbles can be used to assist the abrasion or removal process by exploding on the surface to assist in removal of a selected material.

The transfer fluid can also be substantially pressurized with the selected gas, including air or oxygen, and exit a nozzle at a selected velocity and flow rate. The velocity and flow rate of the transfer fluid exiting the nozzle can include a selected pressure that causes the micro-nanobubbles to collapse and form a radical (which could include superoxide anions, peroxides, hydroxyl radicals, or hydroxyl ions) that is introduced into a vessel to be dissolved in the transfer fluid. Accordingly, the pressurized transfer fluid can be used to chemically oxidize contaminates of concern and/or dissolved metals.

The system and methods disclosed herein allow for producing dense clouds of micro-nanobubbles (bubbles that can have a population average diameter of less than about 100 microns, less than about 50 microns, and about 10 nanometers to about 50 microns) in an aqueous liquid that simultaneously do not require the use of additives, such as surface active agents or ions, to achieve the bubble size and quantity and allow the size of the majority of the bubbles to be easily adjusted from tens of nanometers to tens of microns. The bubbles can also can be delivered into a host liquid with a transfer liquid having a high gas: carrier liquid (v:v) ratio (e.g., greater than about 0.1:1) even for sparingly soluble gases such as oxygen and air. The system can be easily scaled up to industrial levels, for example, 50 to many hundreds of gallons of transfer liquid/minute for treatment of millions of gallons of host liquids or treatment of environmental surfaces encompassing millions of square meters. The bubbles can be delivered in a transfer liquid at high velocity into water-immiscible liquids such as oils for producing fine oil-in-water and water-in-oil emulsions. The system can be used for various purposes, including wastewater and environmental contaminate treatment.

According to various embodiments, a very practical and versatile way for delivering micro-nanobubbles at high gas densities and velocities is disclosed. The potential applications of the invention are numerous and include treatment of wastewater containing a wide spectrum of contaminants from any source, including domestic, municipal, industrial, and agricultural origins. Treatment/aeration of any water, whether static or moving, contained or open, including ponds, lakes, bays, wetlands, marshes, estuaries, swamps, and oceans; brooks, streams, and rivers; and groundwater, well water, aquifers, and water in other confinements such as ballast tanks and storage tanks. Treatment of oil spills, including crude oil in or on any type of water or seawater in any open or contained location. Emulsification of water-immiscible liquids, such as oils, including crude oil and fuels, such as diesel fuel. Cleaning of any surface coated with water-immiscible liquids such as crude oil, including inanimate objects such as rocks, sand, coral, boats and other man-made objects; and animate objects including plants and animals.

Another aspect of the disclosed tube and/or nozzle design is that an adjustment of various parameters that affect a Reynolds number of flow through the nozzle can be used to affect the size of the micro-nanobubbles, because all or a significant number of sites of heterogeneous nucleation are eliminated in the nozzle design. As discussed herein, various parameters can affect or change the Reynolds number and these can affect the size of the micro-nanobubbles produced. The size of the micro-nanobubbles can be selected for various applications.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
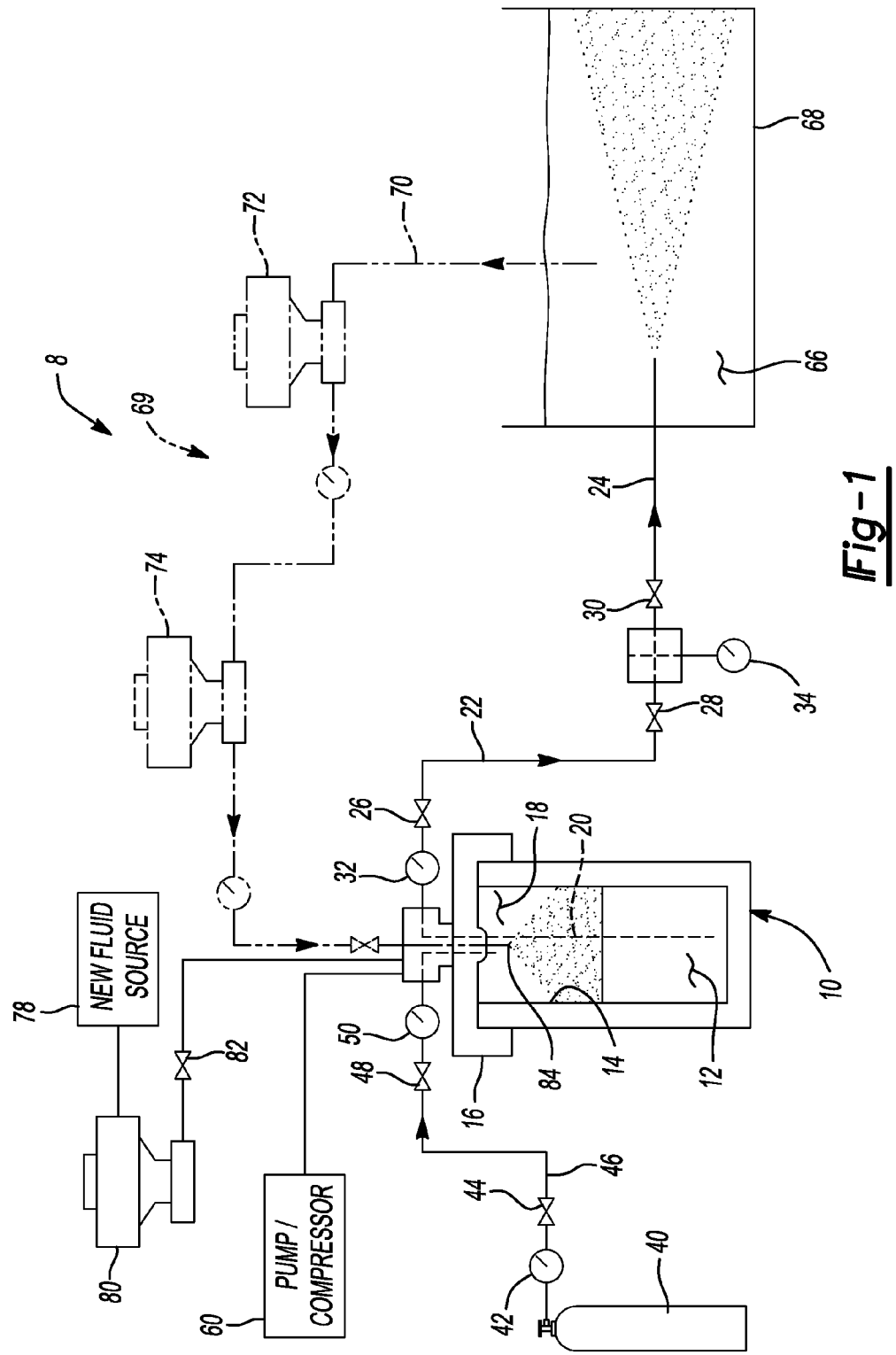
FIG. 1 is a schematic illustration of a fluid transfer system and body.
Figure 2B:
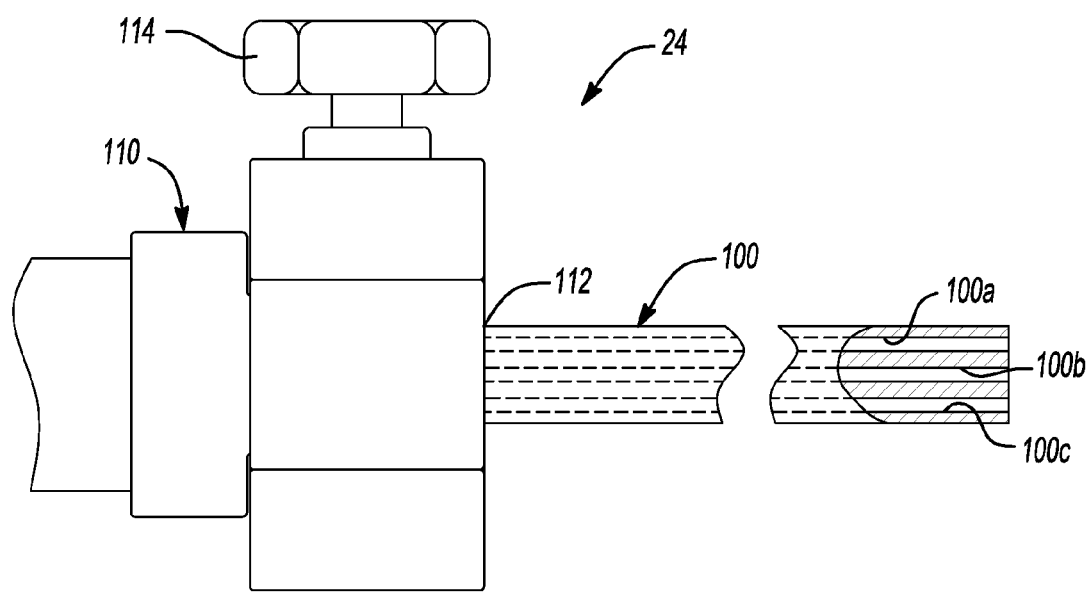
FIG. 2A is a schematic illustration of a tube according to various embodiments.
Figure 2E:
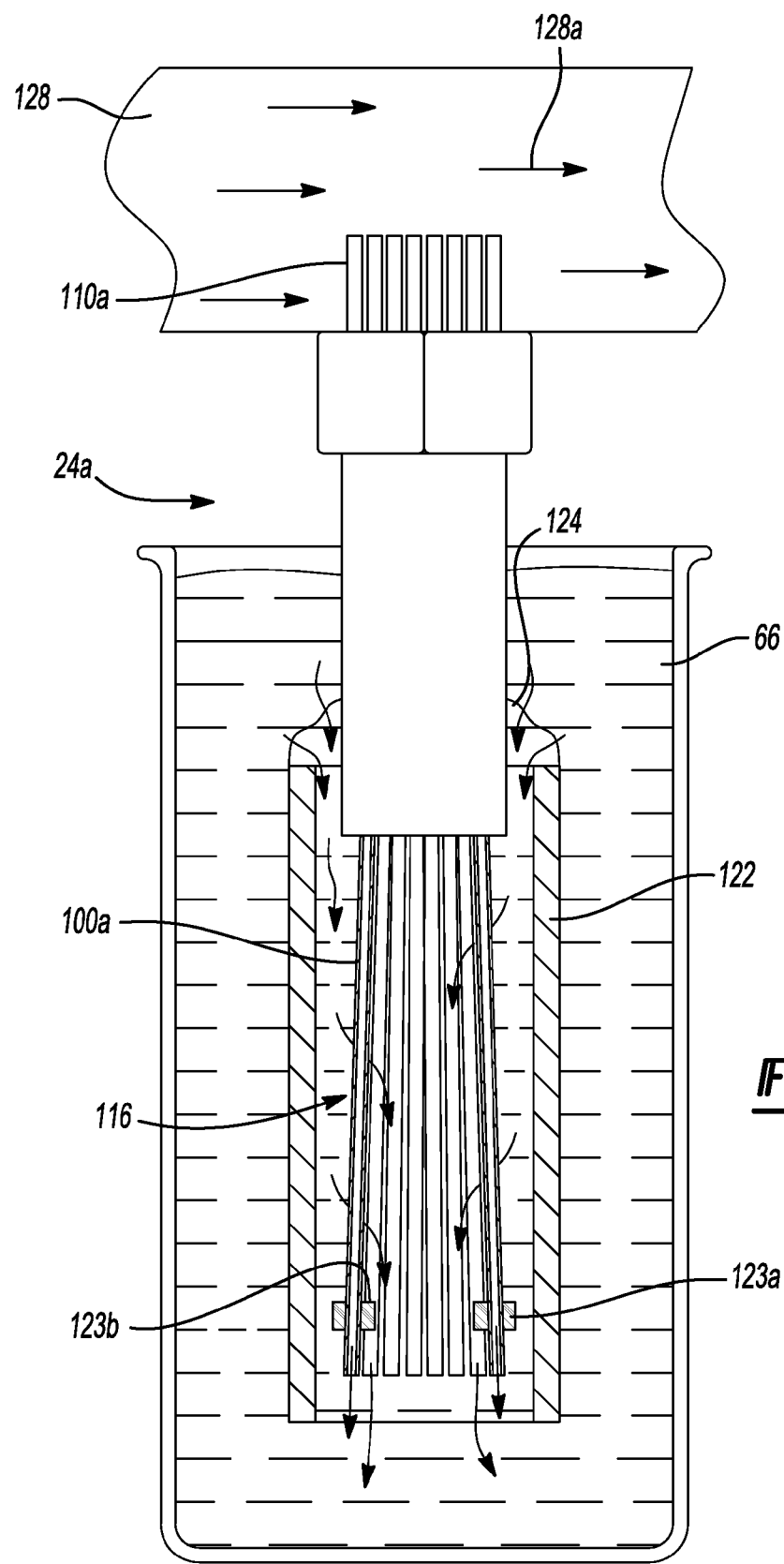
Figure 3:
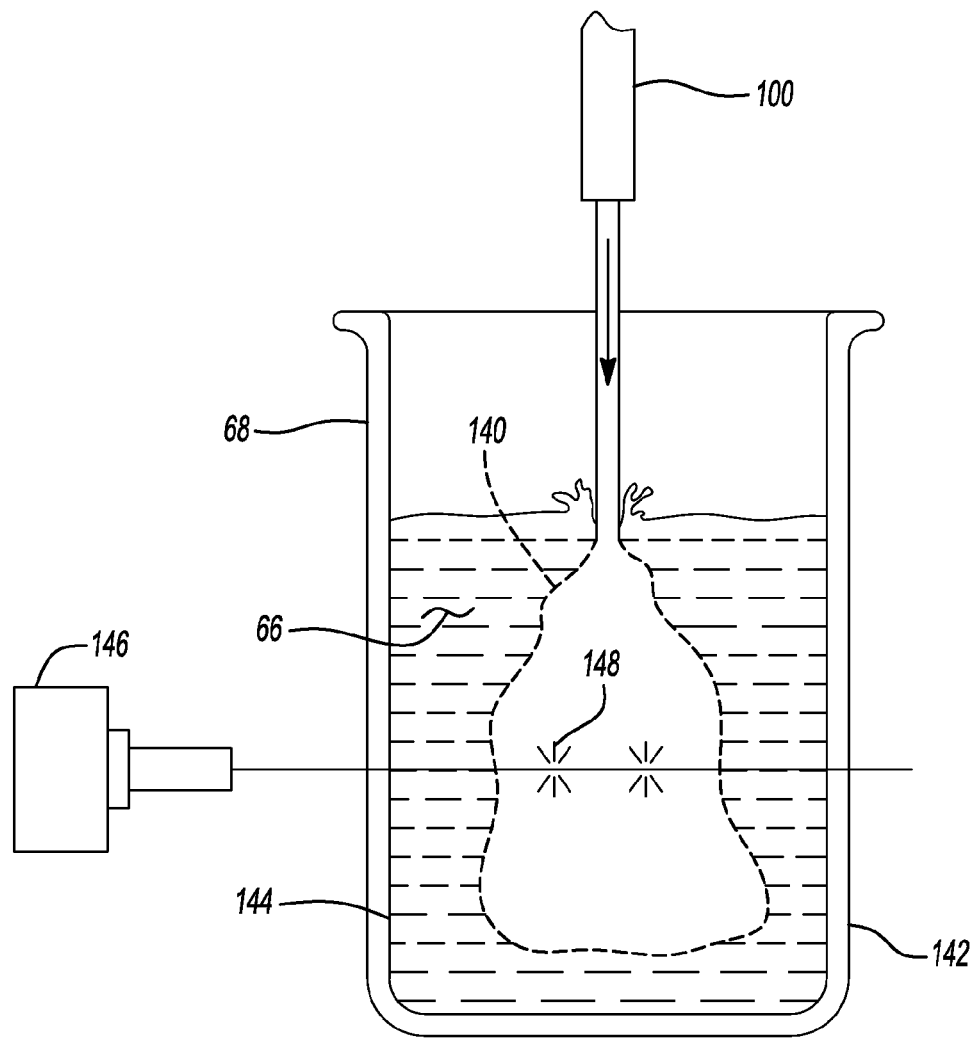
Figure 5:
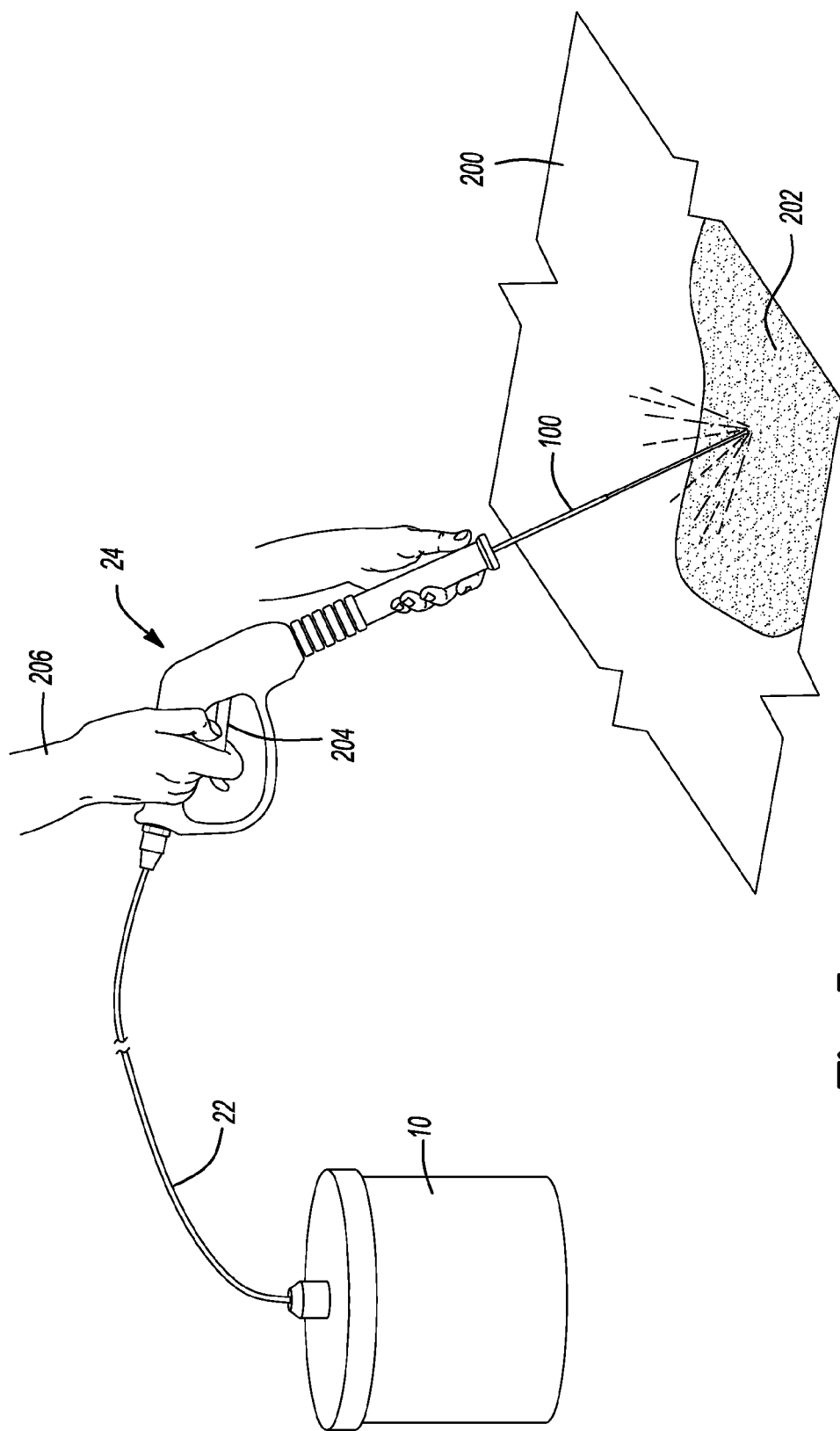

FIG. 2A1 is an end elevational view of a tube according to various embodiments;

FIG. 2A2 is an end elevational view of a tube according to various embodiments;

FIG. 2B is a schematic illustration of a nozzle according to various embodiments;

FIG. 2C is an exploded schematic view of a nozzle with a plurality of tubes;

FIG. 2D is a perspective view of a nozzle with a plurality of tubes within a housing;

FIG. 2E is an exemplary view of a transfer fluid being injected into a volume of water with the nozzle of FIG. 2C;

FIG. 3 is an exemplarily view of a transfer fluid being ejected at a volume of water;

FIG. 4A is an illustrative view of a container holding a first fluid that is immiscible with a second fluid;

FIG. 4B is an illustrative view of a transfer fluid being injected into a container holding a first fluid that is immiscible with a second fluid;

FIG. 4C is an illustrative view of a maintained emulsion of the first fluid and the second fluid after an injection; and FIG. 5 is a schematic view of a flow of transfer fluid impinging upon a surface.

Corresponding reference numerals indicate corresponding parts throughout the several views of the drawings.

DETAILED DESCRIPTION

Example embodiments will now be described more fully with reference to the accompanying drawings.

With reference to FIG. 1, a gas transfer system 8 can include a containment vessel 10 that is used to hold a transfer fluid 12 within an internal wall 14. The containment vessel 10 can also be referred to as a pressure vessel that is capped or lidded with a lid or containment top 16 to seal an internal volume 18 of the containment vessel 10 defined by the internal wall 14 and the containment top 16. The containment vessel 10, however, need not have a flange lid, but can have any appropriate top which may be welded, adhered, or otherwise enclose the internal volume 18. The transfer volume 12 can be held within the containment vessel 10 until it is released through a tube or passage, the tube can be constructed as a dip tube 20 in the containment vessel. It will be understood, however, that the dip tube 20 withdrawal is not necessary and a drain from the lower portion of the containment vessel 10 may be used.

The transfer fluid 12 can pass through a nozzle tube or transfer line 22 and through a nozzle 24, of selected dimensions. Between the containment vessel 10 and the nozzle 24, along the transfer line 22 can be appropriate valves, such as a first valve 26, a second valve 28, and a third valve 30. The valves 26, 28, and 30 can be appropriate valves including ball valves to cease flow of the transfer fluid 12 from the containment vessel 10. Additionally, appropriate regulators and pressure meters, such as a first pressure dial 32 and a second pressure dial 34 can be used to monitor the pressure through the transfer line 22 of the transfer fluid 12.

The containment vessel 10 can be pressurized with a selected gas from a selected gas source. The selected gas can be selected based on the application into which the transfer fluid 12 will be transferred, and can include oxygen, helium, air, nitrogen, carbon dioxide, and other appropriate gases. Also, the gas can be provided in a liquid form before introduction into the containment vessel. Also a gas generation, such as an oxygen generation, system can be provided to provide the gas. A first gas source can include a pressurized gas container or cylinder 40 which can include a regulator system including a pressure dial 42 and a first valve 44 that transfers a gas through a first gas transfer line 46 through a second valve 48 and a second pressure dial 50 into the internal volume 18 of the containment vessel 10.

Appropriate connections can be used to connect the gas cylinder 40 to the containment vessel 10, such as those generally understood in the art. The gas cylinder can be a gas cylinder including those provided by AIRGAS. A second gas source can include atmospheric air that is compressed and pumped to the containment vessel 10 with a pump or compressor 60. A selected compressor can be a hydraulic piston pump used to pressurize air to a selected pressure.

Within the containment vessel 10, the gas, either from the gas cylinder 40, the compressor 60, or other appropriate gas source can be used to establish the operating pressurize of the transfer fluid 12 within the containment vessel 10. In pressurizing the transfer fluid 12 within the containment vessel 10, to slightly above the established operating pressure, a portion of the gas introduced into the containment vessel volume 18 can become dissolved within the transfer fluid 12. The amount dissolved or concentration of the gas within the transfer fluid can depend on the solubility of the gas in the transfer fluid 12 and operating pressure and the residence time in the pressure vessel. The transfer fluid can be aqueous (e.g. plain water), non-aqueous, or mixtures thereof.

The transfer fluid 12, when including an appropriate amount of dissolved gas, can be released through the dip tube 20 and the nozzle 24 into a receiving body or volume 66. The residence time in the vessel is generally sufficient to fully saturate the gas in the transfer fluid 12 at the selected pressure. The receiving volume 66 can be any appropriate material, such as water, an immiscible fluid (e.g. wastewater, process water, vegetable or food oils, crude or natural oils, or hydrophobic materials). The receiving volume 66 can be held within a container 68. Alternatively, the receiving volume 66 can be a slip stream of liquid. Also, the receiving volume 66 can be an open or uncontained volume, such as a river, stream, wetland, lake or ocean. Further, the receiving volume 66 can be a completely or partially container portion of a larger volume of liquid, such as a boom contained in a portion of a lake or ocean. For example, the nozzle 24 can be used to direct the transfer fluid 12 into an open body of water, including a river, a lake, an ocean, or any other appropriate volume of material. Further, as discussed herein, the nozzle 24 can be used to direct the transfer fluid 12 to a non-liquid surface for appropriate purposes, such as abrasion for cleaning.

As the transfer fluid 12 is removed from the containment vessel 10 and ejected from the nozzle 24, make-up fluid can be introduced into the containment vessel 10 to reduce or eliminate the possibility of emptying the containment vessel 10. If the containment vessel 10 is emptied of liquid then the gas may escape in an uncontrolled manner. The fluid may be replenished with a replenishing fluid from an appropriate transfer fluid source. It will be understood that once the containment vessel 10 is empty, the gas from the gas source, including the gas cylinder 40 or the compressor 60 will escape at an uncontrolled rate and can no longer be efficiently transferred to the receiving volume 66 by the transfer fluid 12.

According to various embodiments a recycle system 69 can transfer a portion of the receiving volume 66 through a recycle line 70 back into the containment vessel 10. In the recycle system 69 a first pump 72 and a second pump 74 can be used to move and pressurize a portion of the receiving volume 66 to a pressure that exceeds the selected operating pressure in the containment vessel 10. It will be understood that any appropriate number of pumps can be used in the recycle system 69. The pumps can pressurize the recycled portion to a pressure greater than that within the containment vessel 10. Also, the recycle system can create a substantially closed system, but is not necessary. For example, the recycle system 69 can be used in a slip stream where the receiving volume 66 is flowing and continually being added to and portions removed that have been treated with the transfer fluid (e.g. a river or wastewater slip stream).

Alternatively, or in addition to the recycle system 69, a completely separate new fluid source 78 can be provided to replenish the containment vessel 10 at an appropriate rate. A third pump 80 can be used to pressurize the fluid from the new fluid source 78 before it enters the containment vessel 10. For example, the fluid from the new fluid source 78 can be pressurized to a pressure higher than that in containment vessel 10. A valve 82 can be used to control the flow of the fluid from the new fluid source 78.

It will be understood that the refilling of the containment vessel 10 with the replenishing fluid, either from the new fluid source 78 or the recycled fluid system 69 from the receiving volume 66 can equal a rate of removal of the gas transfer fluid 12 from the containment vessel 10. Thus, a selected amount of the transfer fluid 12 can be maintained in the containment vessel 10 for dissolving the gas introduced into the containment vessel 10. This can allow for a continuous provision of the transfer fluid to the receiving volume 66.

It will be understood, however, that according to various embodiments the second pump 74 and the third pump 80 can be combined and can be a variable speed pump. Thus, the replenishing fluid can come from multiple sources through a single pump. Also, the variable speed pump can be provided to ensure an appropriate volume of the transfer fluid 12 in the containment vessel 10. That is when the transfer fluid is lower in the containment vessel 10 the variable speed pump can operate faster and then slow when the volume is greater. It will be further understood, that any and all of the pumps 72, 74, and 80 can be variable speed pumps for the same purposes.

Regardless of the source of a replenishing liquid, the replenishing liquid can enter the containment vessel 10 through a sprayer or atomizer 84. The sprayed replenishing liquid can accelerate the dissolution of gas used to pressurize the containment vessel as the replenishing fluid resides in the containment vessel prior to exiting through the dip tube 22. It will be understood that if the recycling system 69 is used, therefore, that a portion of the material in the receiving volume 66 can be introduced into the containment vessel 10. For example, contaminate materials, including surface active agents (surfactants), microbes, microbial nutrients, oils, can be introduced into the containment vessel 10 with the recycle system 69. These contaminants have been shown to consume additional oxygen to partially chemically oxidize some contaminants (notably ammonia, methane, and hydrogen sulfide) within the pressure vessel without reducing the amount of oxygen delivered in the transfer fluid 12.

The volumes of the new fluid source 78, or the gas volumes or flow rates provided by the gas cylinder 40 or the compressor 60 and the volume of the containment vessel 10 can be selected for various applications. Additionally, the flow rate of the recycle pumps 72, 74 can be selected to provide the replenishing fluid to the containment vessel 10 at an appropriate rate. It can be selected to introduce the replenishing fluid from new fluid source 78 or the recycle system 69 at a selected pressure to the containment vessel 10 to assist with pressurizing the transfer fluid 12 within the containment vessels 10 and overcoming the pressure from within the containment vessel 10.

According to various embodiments, the gas transfer system 8, discussed above, can include a portion disclosed U.S. Pat. No. 5,569,180, incorporated herein by reference. For example, the containment vessel 10 for the gas source, either from the cylinder 40 or the compressor 60 can include vessels as discussed above. However, to generate a transfer of gas via a very high density of micro-nanobubbles is accomplished with a tube or nozzle of an appropriate dimension (along with other factors as discussed herein) for generation of the micro-nanobubbles in the receiving volume 66.

With reference to FIG. 2A, a tube 100 can be included within the nozzle 24, illustrated in detail in FIG. 2B, either alone or as a bundle. The tube 100 can be selected to include an internal diameter 102, a length 104, a material to coat or form at least an interior surface 106 of the tube 100. The internal diameter 102 can be substantially uniform throughout the length of the tube 100. A uniform internal diameter can assist in reducing nucleation points for bubble formation. The material for the interior wall 106 can be selected to be substantially hydrophilic. A substantially hydrophilic material, such as glass including fused silica, can assist in micronanobubble formation as opposed to a hydrophobic material, including fluorocarbons (e.g. TEFLON®). Hydrophobic materials produces substantially larger bubbles.

FIG. 2A1 illustrates an exemplary round or cylindrical internal diameter 102 of the tube 100. The internal diameter 102 can be substantially constant the length 104 of the tube 100. It will be understood that other cross-sections or internal configurations can also be provided. For example, an elliptical or slit like opening, as illustrated in FIG. 2A2, can be provided that includes a small dimension 103 and a large dimension 103b. The small dimension 103a and the large dimensions 103b can be substantially constant the length 104 of the tube 100, but can provide a non-circular opening. It will be understood that other appropriate cross-sections can include square, rectangle, oval, etc.

The micro-nanobubbles are selected to generally have a diameter of less than about 100 microns, and particularly less than about 50 microns, and even further less than about 1 micron and measuring between 100 and 1000 nanometers. Further, a population of the micro-nanobubbles can be formed to have an average diameter that is within the range disclosed above. The micro-nanobubbles are formed in the receiving volume 66 after exiting the tube 100. Generally, the transfer fluid 12 will leave the tube 100 as a liquid lance that is substantially similar in diameter to the internal diameter 102 of the tube 100. Also, the transfer fluid 12 at the distal end of the tube 100 can be rapidly infused into the receiving volume 66 causing the combined fluid to have a density substantially similar to that of the non-gasenriched fluid that makes up the transfer fluid 12.

The micro-nanobubbles can be used for various applications, as discussed further herein, for introducing the gas into the receiving volume 66 (e.g. oxygenating the receiving volume 66). In providing the selected internal diameter 102 and length 104 of the tube 100 the size of bubbles, generally in a micro-nanobubble range can be achieved. Additionally, the partial pressure of the gas within the containment vessel 10 can be used to assist in generating the micro-nanobubbles.

Generally the internal diameter 102 can be greater than 100 microns and less than about 2.5 centimeters (about 1 inch). The length 104 of the tube 100 can be selected to be an appropriate length which can be about five inches to about 15 inches, including about 5 inches, about 8 inches, and about 10 inches. In addition, the internal diameter 102 of the tube 100 can be provided to be substantially uniform along the length 104 of the tube 100. Accordingly, the tube 100 need not taper and can define a substantially uniform inner cylinder within the tube 100 thus having a substantially uniform cross-section throughout the length 104 of the tube 100. The tube 100, therefore, is not required to include any choke points, waists, or tapers to allow for a generation of turbulence or nucleation points within or defined by the tube 100.

As is understood, generally in fluid dynamics, the flow of a liquid through a tube having particular internal dimensions and length can be defined by a Reynolds number. The Reynolds number is also based upon various factors including the velocity of the fluid, the density and velocity of the fluid flowing through the tube, and the dimensions of the tube. Accordingly, the flow rate and viscosity of a material, such as the transfer fluid 12, which flows through the tube 100 can affect the Reynolds number of the transfer fluid 12 through the tube 100. The Reynolds number can be selected to generate substantially non-laminar flow and generate the micro-nanobubbles. As is understood, laminar flow is generally deemed to be present when a calculated Reynolds number is less than about 2300. Accordingly, a Reynolds number greater than about 2300 can be used to generate micro-nanobubbles.

The size and density of the micro-nanobubbles can be augmented or selected based upon the Reynolds number generated with the flow of the transfer fluid 12 through the tube 100. The factors can include selecting the material of at least the internal wall 106 of the tube 100, the internal diameter 102 of the tube 100, and the length of the tube 104. Additionally, the partial pressure of the gas within the containment vessel 10 can be selected to also assist in achieving a selected Reynolds number to select the size of the micro-nanobubbles generated when the transfer fluid 12 flows through the tube 100.

With reference to FIG. 2B, the nozzle 24 can include a single tube 100 connected to a handle/control system 110 at a selected joined area 112. The handle 110 can include a control mechanism 114 that includes an external handle that operates an internal valve. It will be understood, however, that the nozzle 24 can be connected to a manifold system that allows the nozzle 24 to be operated at a distance or a plurality of the nozzles 24 interconnected together through use of a manifold system. For example, a plurality of the nozzles 24 can be connected to a single supply, in series or in parallel, and operated with a manifold to supply the supply line. The manifold can be designed and operated in a manner that allows rapid decompression that causes the supplying carrier fluid to pass the high pressure end of the tube perpendicular to the tube and thereby dislodge and remove particulates that may build up on the inlet end of the tube 100 during operation. The connected nozzles 24 could then be incorporated in other systems, such as floating boom placed in the receiving volume 66.

With continuing reference to FIG. 2B, a plurality of the tubes 100a, 100b, 100c can be interconnected to provide a plurality of the tubes 100a-c in a generally parallel manner within a single one nozzle 24. It will be understood that any appropriate number of the tubes 100 can be interconnected with the handle mechanism 110 to allow for the passage of the transfer fluid 12 through the nozzle 24. The plurality of tubes 100a-100c, or any appropriate number less than or more than three, can be used to achieve an appropriate flow rate through the nozzle 24 that is not necessarily achieved through a single one of the tubes 100. For example, if a flow rate of 66 milliliters per minute may be achieved through a single one of the tubes 100, but a flow rate of approximately 500 milliliters per minute can be selected to flow through the single nozzle 24. In such a situation, a plurality, such as about 8, of the tubes 100 including selected dimensions can be interconnected with the handle mechanism 110 to assist in achieving the selected flow rate. As discussed further herein, in the examples described below, including the tube 100 of various selected dimensions can achieve various selected flow rates through the nozzle 24.

The tube 100, or the plurality of tubes 100a-100c, can be formed of selected materials to assist in achieving the appropriate Reynolds numbers and the selected micro-nanobubble diameter through the nozzle 24. For example, stainless steel, fused silica, fluorocarbons (e.g. Teflon®), polymer or plastic materials, ceramics, and the like can be selected to form the tube 100. It will also be understood, however, that an appropriate physical characteristics of the wall 106 are selected or that the internal wall 106 can be coated or formed of a selected material and an external surface of the tube 100 can be formed of a second material. Accordingly, a metal or stainless steel tube can be coated with a polymer coating to achieve an internal surface of a selected material.

FIGS. 2C and 2D illustrates a nozzle 24a, according to various embodiments of the nozzle 24, including a plurality of tubes 100a, according to various embodiments of the tube 100. In the nozzle 24a, any selected number of tubes can be provided. Each of the tubes 100a is about 20 cm (about 8 inches) long, such as about 19.8 cm (about 7.8 inches) to about 20.8 cm (about 8.2 inches) in length. The tubes have a substantially constant internal diameter of about 0.79 mm. Each tube is formed of stainless steel.

For example, 20 of the tubes 100a can be provided. If each tube delivers about 0.25 gallons per minute then 20 of the tubes 100a can provide about five gallons per minute. Thus, the number of tubes 100a can be selected to achieve an nozzle 24a delivery volume rate.

The assembly of tubes 116 can be fit into a fitting 118. The array of tubes can be in a cone configuration such that an outlet end 120a is more disperse than an inlet end 120b. Within the fitting 118 the tubes 100a can be sealed together so that substantially no liquid can pass between the tubes from the fitting 118, but substantially only through the tubes 100a. A cover housing 122 can be positioned over the tube assembly 116 and mounted to the fitting 118. An outer snap ring 123a and inner snap ring 123b can help hold the tubes within the outer housing 122. It will be understood that only one snap ring may be used or that a ring with drill or throughbores may be used alternatively or in addition to the two rings 123a, b.

As illustrated in FIGS. 2D and 2E the outer housing 122 can be held to the fitting 118 with one or more welds 124. The welds can be spaced apart to define openings or passages 126. The passages 126 can allow liquid to flow around each of the tubes 100a in the assembly 116. This can assist in maintaining a selected bubble size from the tubes 100a. That is, each of the tubes 100a in the assembly 116 can act independently to generate the selected bubble size based on the calculated Reynolds number.

In FIG. 2E, the nozzle 24a is positioned within the receiving volume 66. That is the nozzle 24a is submerged completely or a selected amount within the receiving volume 66. A supply line 128 can supply the nozzle 24a. It will be understood that a plurality of the nozzles can be connected to the single supply line 128. Also, cleaning the inlet side of the nozzle can be achieved by allowing the transfer fluid 12 to flow rapidly past the high pressure end of the nozzle 24a to dislodge and carry build-up from the inlet end of the nozzle 24a down the supply line 128 generally in the direction of arrow 128a instead of forcing it towards the nozzle 24a.

As discussed above, the generation of micro-nanobubbles in the receiving volume 66 by the flow of the transfer fluid 12 through the nozzle 24 can be achieved by altering various characteristics. For example, the internal diameter 102 and the length 104 of the tube 100 can be used to achieve appropriate Reynolds numbers. Characteristics of the tube 100, the transfer fluid 12, the gas within the transfer fluid 12, and characteristics of the receiving volume 66 can all be factors in determining the size of micro-nanobubbles. For example, the internal surface being hydrophobic (when the transfer fluid 12 is aqueous) can generate bubbles internally or provide nucleation points within the tube 100 for the growth of bubbles within the tube 100. Hydrophilic materials generally allow for less bubble formation within the tube 100.

Also, smooth surfaces on the internal surface 106 of the tube 100 can reduce nucleation points for bubble formation within the tube 100. A smooth surface can be a surface that has values or peaks of less than about 50 nanometers, and further less than about 10 nanometers. Also, the end of the tube 100 can be formed or polished to be substantially smooth having peaks or values of less than 10-50 nanometers. Examples include fused silica or polished stainless steel tubes.

Additionally, the composition of the transfer fluid 10, including the type of fluid being aqueous fluid or non-aqueous fluids, can affect the size of the micro-nanobubbles. In addition, suspended particles, including the size and density, can affect the bubble size generation. The velocity of the transfer fluid 12 passing through the tube 100, which can be referred to as a transit time or a tube transit time, can also affect the number and size of the micro-nanobubbles. Accordingly, a shorter tube, such as a shorter length 104, and a higher flow rate will decrease the tube transit time and minimize or eliminate nucleation of bubbles within the tube 100. Additionally, the characteristics of the transfer fluid 12 including temperature, density, and the like can also affect the bubble size and Reynolds number.

Characteristics of the receiving volume 66 can also affect the micro-nanobubble size. The velocity, gas concentration, temperature, flow rate, turbulent nature of the receiving volume 66, and other physical characteristic of the receiving volume 66 can affect the size of micro-nanobubbles within the receiving volume 66. Nevertheless, given the characteristics of the receiving volume 66, the transfer fluid 12, and the partial pressure of the gas in the transfer fluid, the physical characteristics of the tube 100 can be selected to achieve bubbles in the micro-nanobubbles size range in the receiving volume 66.

The micro-nanobubbles can refer to a mean or average observed size of bubbles in a cloud of micro-nanobubbles 140 formed in the receiving volume 66. As illustrated in FIG. 3, the receiving volume can be held in the tank 68. The cloud of micro-nanobubbles 140, as illustrated in FIG. 3, is typically not visible to the naked eye and can be seen with various interrogation techniques, such as translumination. For example, the tank 68 can have opposed clear walls 142 and 144 and a light source 146 can be directed at the cloud of micro-nanobubbles 140 through the clear walls 142, 144. Scattering of the light illustrated by hash marks 148 can assist in viewing the cloud of micro-nanobubbles 140. The light source 148 can include an incandescent light. Also, a laser, such as an argon ion laser light, can be shown through the tank 68 and the cloud of micro-nanobubbles 140. The light source 146 can be used to assist in a human observer viewing the cloud of micro-nanobubbles 140 as a fine cloud in the receiving volume 66. If the cloud of micro-nanobubbles 140 is observable only with argon ion laser translumination then it is concluded that the average bubble size in the cloud of micro-nanobubbles 140 is less than or equal to about 1 micron or nanometer in size.

Generally, as discussed above, the micro-nanobubbles can be selected to be about less than 100 nanometers (nm) to about 200 microns, including about 100 nm to about 100 microns, and further including less than about 100 nm and less than about 50 microns. In a system where the transfer fluid 12 is an aqueous fluid and the transfer fluid is saturated to about 0.1 ml of oxygen ($O_2$) per gram of water to about 1.0 ml of oxygen ($O_2$) per gram of water, a Reynolds number of about 2,200 to about 100,000 can be used to generate the micro-nanobubbles in the receiving volume 66. The range of Reynolds numbers can further includes about 5,000 to about 50,000. The pressure of the gas used to achieve the levels of gas saturation in the containment vessel 10 can include about 4 bar to about 40 bar, including about 6 bar to about 30 bar, and further including greater than about 8 bar, such as about 20 bar.

EXAMPLES

In the following four micro-nanobubble examples and one comparative example, exemplary dimensions of the tube 100 are discussed in combination with the size of bubbles generated and calculated Reynolds numbers related to the physical characteristics of the tube 100.

Examples Test Apparatuses

For Examples 1 and 2, a batch test apparatus was used, as illustrated in the fluid delivery system 8 of FIG. 1, including the gas cylinder 40, the contaminant vessel 10, the nozzle 24 including a single tube of dimensions discussed in the various examples, and the container 68 including the receiving volume 66.

In particular, the containment vessel 10 included a 600 milliliter capacity 316 stainless steel Parr reactor vessel (from Parr Instruments, Inc.) that was filled with 500 milliliters of distilled water and pressurized with oxygen to a pressure of 300 psi (20 bars). The distilled water was then stirred at 1600 rpm with a magnetic stirrer for at least two hours to saturate the water with the oxygen at the 300 psi. A dip tube, such as the dip tube 20, was connected in the Parr reactor vessel and connected to an external delivery tube with an O-ring adapter that allowed for a quick connection of a selected tube configuration. While releasing the distilled water from the Parr reactor vessel, a cylinder filled with the oxygen (e.g. Airgas, Inc. standard Cylinder) was connected via a regulator to the Parr reactor vessel and the regulator maintained a 300 psi pressure to the Parr reactor vessel. The nozzle was used to inject the distilled water into a glass aquarium filled with water drawn from a tap connected to a municipal source.

Interrogation and inspection for bubbles within the aquarium included visual inspection by transillumination (shining a light through the aquarium tank and viewing the aquarium tank with the naked eye) with ordinary light provided by an incandescent bulb and with a fiber optically delivered beam of chemical argon ion laser radiation. The argon ion laser radiation was from an approximately one watt source connected to a silica fiber optic cable (e.g. 400 micron core) with approximately 0.5 watts delivered to the distal end of the fiber optic core. All of the following examples were run at a temperature of about 20 degrees Celsius to about 21 degrees Celsius.

Concentration of oxygen was determined by filling a plastic syringe having a rubber stopper plunger with about 20-30 milliliters of the saturated water and closing one end of the syringe and tapping the syringe. The amount of movement of the plunger within the syringe was subtracted from the volume of original saturated water drawn into the syringe. The difference is calculated to be a conservative estimate of the volume of dissolved gas in the saturated water because the liquid remains highly saturated with oxygen.

In Examples 3 and 4, a continuous flow test apparatus was used due to the high flow rates. In particular, tap water from the same source that filled the aquarium tank was boosted to a pressure of about 400 psi using a hydraulic piston pump and was delivered to a fine spray nozzle (e.g. a BETE® nozzle sold by BETE FOG NOZZLE, INC.) mounted within a 27 liter 316 stainless steel pressure vessel. The pressure vessel was initially empty and pressurized to about 300 psi with oxygen from a compressed oxygen cylinder. Water was then sprayed into the 27 liter pressure vessel from the piston pump and allowed to mix with the pressurized oxygen within the 27 liter pressure vessel. The vessel was then filled about half full (via measuring the weight of the vessel) with the pressurized tap water and then the saturated water was allowed to exit through the tube. A test was used to determine, as discussed above, that the concentration of oxygen in the water was about 0.5 milliliters of oxygen per milliliter of water.

Examples 1 and 2 were also re-tested using the continuous flow system with the 27 liter capacity pressure vessel and the source of pressurized tap water and substantially identical results were achieved.

Example 1

Tube: Formed of fused silica and included a constant internal diameter of approximately 225 microns and a length of approximately 13 centimeters (about 5 inches). The tube was used to direct the distilled water into the aquarium tank filled with the municipal's tap water.

Reynolds number calculation: A Reynolds number of 6,075 was determined based on a flow rate of 66 milliliters per minute and a flow velocity of 27.7 meters per second.

Bubble interrogation: incandescent light revealed no visible bubbles. Argon ion laser radiation revealed a prominent cloud of bubbles.

During the interrogation of the aquarium tank, no bubbles were viewed with either incandescent lights or with the argon ion laser at the end of the tube within the aquarium tank. Interrogation with incandescent light did not allow for the observation of any bubbles. However, a faint cloud of bubbles was noted with argon ion laser illumination several centimeters from the end of the tube. Accordingly, without being bound by the theory, it was concluded that no bubbles were generated within the tube and that all of the bubbles were generated due to the turbulence of the mixing of the saturated water and the tap water. Additionally, due to the apparent non-presence of bubbles under the interrogation with incandescent lights, but due the visibility of the bubbles while in interrogation with the argon ion laser radiation, the bubbles are concluded to be the micro-nanobubble size range, particularly in the sub-micron and nanometer range.

Example 2

Tube: Formed of fused silica and included a constant internal diameter of about 450 microns and about 13 centimeters in length (about 5 inches).

Reynolds number calculation: A Reynolds number of 5,670 was determined based on a flow rate of 100 milliliters per minute and a flow velocity of 12.6 meters per second.

Bubble interrogation: With incandescent light a fine cloud of bubbles appeared. With argon ion laser radiation a much denser fine cloud was visible.

Substantially no large bubbles were observed, only a fine cloud of bubbles. Due to the visibility of both a fine cloud under incandescent light and laser light it is predicted that the bubbles were both nano-bubbles and micro-bubbles. In particular, the micro-bubbles being several microns such as about one to 20 microns. In particular, light microscopy was able to view bubbles in the micron and less diameter range. However, because the cloud appeared denser with the argon ion laser it is predicted that the cloud included a substantial concentration of bubbles having a diameter of less than one micron.

Example 3

Tube: Formed of stainless steel and included a substantially constant internal diameter of about 794 microns and a length of about 20 centimeters (about 8 inches).

Reynolds number calculation: A Reynolds number of 15,562 was determined based on a flow rate of 580 milliliters per minute and a flow velocity of 19.6 meters per second.

Bubble interrogation: With incandescent light a faint cloud of bubbles generally within a cone-shaped region extending from the end of the tube was observed. The bubbles were substantially fine and an amount of large bubbles was not generally observed. With the argon ion laser illumination, the cloud appeared more dense, but still consisted of fine bubbles. The observation of fine bubbles under interrogation with both incandescent light and the argon ion laser light, with the density of the cloud of bubbles being viewed with the argon ion laser light interrogation confirmed that the bubbles were substantially within the 20 micron or less range, with a greater density being in the sub-micron and nanometer range.

Example 4

The continuous flow test system was used in Example 4 with a 300 psi driving pressure.

Tube: Formed of glass including a substantially constant internal diameter of about 1 millimeter and a length of about 13 centimeters (about 5 inches)

Reynolds number calculation: A Reynolds number of 43,300 was determined based on a flow rate of 2,040 milliliters per minute and a flow velocity of 43.3 meters per second.

Bubble interrogation: With incandescent light a substantially uniform and fine cloud of bubbles was observed. With argon ion laser light a denser cloud was observed.

It is concluded that the bubbles formed with the glass tube having an internal diameter of about 1,000 microns (1 millimeter) achieved a cloud of bubbles that included micro-nanobubbles including a diameter of about 15 to about 20 microns and less, with a greater density having a diameter of less than about one micron.

Comparative Example

Using the batch test system described above with the 600 milliliter Parr reactor vessel a comparative example was tested.

Tube: Formed of fused silica including 100 microns, a length of about 15 centimeters (6.0 inches).

Reynolds number calculation: A Reynolds number of 760 was determined based on a flow rate of 3.6 milliliters per minute and a flow velocity of 7.6 meters per second.

Bubble interrogation: With incandescent light and with argon ion laser light substantially no bubbles of any density within the aquarium tank was observed.

It is concluded that the small diameter tube and low Reynolds number achieved a substantially bubble-less flow of the oxygen-supersaturated water into the aquarium tank. Even upon exiting the tube into the tank, substantially no gas was released or no bubble nucleation occurred from the saturated water.

Accordingly, as illustrated in Examples 1 through 4, it can be illustrated that the size of bubbles can be controlled by using various tube sizes and flow rates to achieve the formation of bubbles within the aquarium tank or any appropriate receiving volume 66. Further, the diameter of the bubbles can be maintained and controlled in a substantially sub-50 micron size, including a vast majority in a sub-micron and nanometer range. Accordingly, micro-nanobubbles can be generated through a tube of selected physical dimensions to allow for the injection of an appropriate or selected gas into the receiving volume 66. The receiving volume 66 can be a liquid of an appropriate type, including those discussed herein in various Applications, and can allow for transferring a gas from the saturated transfer fluid 12 to the receiving volume 66.

APPLICATIONS

There are different types of applications which may affect the optimal geometry of a tube, as discussed herein. One application may be when the nozzle 24 or tube 100 is placed directly in the receiving volume. Another application can be when the nozzle 24 or the tube 100 is in air and ejecting the transfer fluid at a surface of the receiving volume 66.

When a distal (i.e. outlet) end of a tube is submerged under a liquid a selected design for most such applications is a circular luminal cross-section at the distal end of the tube. The velocity of the transfer liquid upon contacting the host liquid to be treated is reduced less in comparison to other cross-sectional shapes (for a given luminal cross-sectional area) such as elliptical, slit-like, square, or rectangular. Therefore, mixing of the transfer liquid with the host liquid is more effective, as is emulsification of water-immiscible liquids.

When the distal end of the tube 100 is in air and only the ejected transfer fluid engages the receiving volume 66 then the selected design for most such applications, primarily ones related to cleaning of surfaces coated with water immiscible liquids such as crude oil (in addition to enhancing aerobic conditions during and after cleaning) can be a slit-like luminal cross-sectional shape at the distal end of the tube 100 while maintaining the selected Reynolds number. The shape of the transit liquid upon exiting the tube 100 is therefore relatively wide in one dimension and can be fan-like, with the wide dimension increasing with distance from the end of the tube 100. The transit liquid at the distal end of the tube 100 can flow between two roughly parallel plates, the narrow space between which can be made to be adjustable during flow, or through a fixed slit-like orifice, to produce a fan-like shape of the transit liquid in air. The advantage of such a shape is that relatively large surface areas of objects to be treated can be treated quickly by moving the fan-like shape across the surface. The force of the tube 100 effluent per unit area of the treated surface can be adjusted by adjusting the distance between the end of the tube 100 and the surface of the object.

Of course, the force of the effluent can also be adjusted by other factors such as the hydraulic driving pressure at the input of the tube 100 and the width of the slit.

It will be understood that in the application where the transfer fluid 24 is ejected through air that an array of the tubes 100 may also provide an optimal or selected coverage. For example, the circular area, as illustrated in FIG. 2C, can provide a large surface area of contact. Also, a linear area of the tubes 100 can provide a fan shaped coverage area. Thus, while each of the tubes can maintain an internal circular configuration, the output may be any selected shape.

Also, various applications can be optimized for different materials of the tubes 100. For example, in highly corrosive environments, like sea water (salt water), substantially non-oxidizing materials may be selected to form or coat portions of the tubes. Coatings can be applied to stainless steel, but other metals can be used, such as titanium, tungsten, tungsten carbide, or tantalum and/or corrosive resistant alloys like Inconel® Metal Alloy (sold by HUNTINGTON ALLOYS CORPORATION), Hastelloy® (sold by HAYNES INTERNATIONAL, INC.), And Monel® (sold by HUNTINGTON ALLOYS CORPORATION). Also, non-metal materials such as glass, ceramic, or polymers, can be used to eliminate or reduce corrosion.

Wastewater Treatment

As discussed above, the transferring fluid 12 can be injected into the receiving volume 66 that is selected for various purposes. According to various examples, wastewater treatment can be enhanced by the addition of a gas that has been dissolved in the transfer liquid 12 and the creation of the micro-nanobubbles in a wastewater treatment facility. The wastewater treatment can be wastewater or contaminated ambient water that is contained within a substantially fixed tank or pond or provided in a wastewater slip stream. The injection of the transfer fluid into a tank or pond can be similar to that described above with an appropriately scaled system to provide a selected rate of injection of the transfer fluid 12 into the wastewater pond. The transfer fluid can also be injected into a wastewater slip stream at an appropriate dilution, such as about 20 parts wastewater to about 1 part injected transfer fluid. This can produce a wastewater slip stream that is about 40 parts per million injected transfer fluid, but still provide the oxygen, or other dissolved gas, at an appropriate level.

The introduction of the transfer fluid 12 into the wastewater can assist in wastewater treatment and cleaning in various manners. For example, upon collapse of the micro-nanobubbles extreme forces can be locally created within the wastewater or receiving volume 66. The high temperature and pressures can generate ions or radicals, such as hydroxyl ions (—OH). The hydroxyl ions can accelerate or cause chemical oxidation of biological materials and even inorganic materials. Such oxidation of materials in wastewater generally makes the oxidized materials less harmful to other biological life, such as humans or animals, which later drink the water. In addition, the oxidized materials can be more easily removed using various and generally known removal techniques.

The micro-nanobubbles can also assist in floatation of small particles that are present in wastewater. As discussed above, the bubbles can form in substantially small sizes to allow for connection to or adhesion to very small particles within wastewater to allow for flotation. The micro-nanobubbles rise very slowly through the receiving volume 66, but nevertheless rise to allow for physical extraction of solids connected to a bubble. Further, a surfactant can either be present in the wastewater or be added to assist in the generation and density or number of micro-nanobubbles generated through the tube 100.

Selected naturally occurring and/or proprietary microbes, enzymes and/or bio-nutrients, such as MicroSorb® microbial composition or BioNutraTech® chemical preparations sold by BioNutraTech, Inc. can be introduced into a wastewater pond or volume to accelerate the biological degradation of various contaminates in the wastewater. The rate of biodegradation is typically limited by the availability of oxygen. For example, microbes can be used to treat municipal, industrial and commercial wastewater by digesting various contaminate chemical/biological species, including oil such in wastewater or contaminated water. Additionally, the contaminated water can include water that is simply in or near a material to be removed, such as water in an ocean or lake that has been contaminated, at least partially, due to an oil or other chemical spill. Accordingly, contaminated water can include a selected area or volume of water that is either contained or uncontained in a larger body of water and the microbe can be dispersed near the contaminate.

The oxygen or gas provided from the transfer fluid 12 to the wastewater area can assist the microbe in the microbe's biological processes by accelerating the biological activity, increasing the population of contaminate consuming microbes, and providing the physical mechanism (the emulsion) to bring the contaminate, the microbe, the nutrient, and oxygen into very close contact and thereby accelerating the entire process to assist in an increased rate of digestion and breakdown of the contaminate. For example, the micro-nanobubbles can provide a large surface area for contacting all of the elements necessary for the degradation, including oxygen, microbe, nutrient, and contaminate. In other words, the large number or small bubbles in the micro-nanobubble size range allows for an appropriately sized package of oxygen for use by the selected microbes. This oxygen package also provides surface area for all of the relevant components, e.g. microbe and contaminate, to reside during degradation of the contaminate by the microbe. The bubble can also provide and area to contact various compounds, such as metals, for oxidation.

For example, a microbe can be positioned near the contaminate in a wastewater basin and the tube 100 can be used to introduce the transfer fluid 12 into the wastewater as the receiving volume 66. The micro-nanobubbles allow for a small volume that can be biologically active relative to the microbe. The microbe may phagocytize the micro-nanobubble to internalize the oxygen present within the micro-nanobubble. Additionally, the micro-nanobubble may connect to both the microbe and a portion of the contaminate to allow for a proximity of the microbe, the contaminate, and a source of oxygen for aerobic respiration of the microbe. It will be understood that additional nutrients, such as BioNutraTech® can be added to assist in biological action of the microbe in addition to the gas provided through the micro-nanobubbles.

Furthermore, other oxidizing agents can be added to assist in oxidizing waste material and/or providing disinfection. For example, UV light can be caused to impinge on the wastewater to disinfect treated effluent prior to discharge. A UV lamp can be provided to impinge on chemical wastewater to provide UV radiation to chemically oxidize the constituent of concern. Various studies have shown that chemical oxidants, such as hydrogen peroxide become more cost effective when coupled with UV light. Additionally, a UV lamp can be used to impinge UV radiation on a wastewater slip stream that is injected with the transfer fluid. The UV radiation can assist in oxidizing the waste material in the wastewater to assist in the breakdown and cleaning of the wastewater. Impinging of the carrier fluid 12 into a wastewater pond or water volume is illustrated in FIG. 1 within the tank 68 and also in FIG. 3 which illustrates the formation of a cloud of bubbles within a volume of water which can also include waste material to be removed either via biological degradation, oxidation, or other appropriate methods. Other oxidizers, such as hydrogen peroxide, can be added to the wastewater either alone or in addition to the UV radiation.

Emulsification

As illustrated in FIG. 4A, the receiving volume 66 can include a first fluid 152 (e.g. water) may be immiscible with a second fluid 154 (e.g. oil) or may include only the second fluid 154 that is immiscible with the transfer fluid 12. The transfer fluid 12 can be injected, as illustrated in FIG. 4B, into the substantially non-aqueous immiscible material, such as cooking oils (e.g. canola oil, vegetable oil, olive oil) or other types of immiscible material including crude or refined oil with the tube 100 that allows for generation of the micro-nanobubbles in the receiving volume 66. It will be understood that the tube 100 can be submerged within the receiving volume 66, according to various embodiments.

As illustrated in FIG. 4C, after a period of time, the emulsification of the aqueous transfer fluid 12 in the immiscible liquid is maintained. The mixture can include, after a period of time, regions of substantially only the first fluid 150 and the second fluid 152. In addition, emulsification layers can include a first emulsification layer 154 that includes droplets of the first fluid within the second fluid and a second emulsification layer 156 that includes droplets of the second fluid in the first fluid.

Emulsification examples include water that has about 50 percent oxygen (vol $O_2$/vol water) that is emulsified with Pennzoil® 5W-30 weight automobile motor oil that remains substantially emulsified, where it includes at least an emulsified portion, for at least 48 hours. Additionally, cooking oil was tested and maintained an emulsification region for at least about 72 hours with similarly oxygenated water. Accordingly, an emulsification of an aqueous fluid, such as water, with an immiscible liquid, such as oil, can be achieved and maintained with the injection of the transfer fluid 12 without an addition of a surfactant.

In a particular example, the emulsification of the transfer fluid 12 and the vegetable oil was analyzed using a Coulter N4MD submicron particle size analyzer. The analysis indicated that submicron, including droplets of oil within the water phase, persisted for at least about 3 days after injection of the transfer fluid 12 with generation of micro-nanobubbles into the vegetable oil. Thus, an emulsification was generated and maintained for an extended period of time without the use of any emulsification agent or surfactant.

Additionally, perflubron (perfluorooctyl bromide) formed an emulsification upon the injection of the transfer fluid 12 (with the formation of micro-nanobubbles) that persisted for at least about 2 hours. By merely shaking a 1:1 volume of the perflubron and water an emulsification lasted for less than one minute. Additionally, inspection of the aqueous phase for particle size analysis with the Coulter N4MD submicron particle size analyzer indicated submicron size particles of the perflubron in the aqueous phase after the emulsification with the injection of the transfer fluid 12 and the formation of the micro-nanobubbles, without any surface active agents (surfactants).

The emulsification can also assist in providing for a dispersion of the transfer fluid and the dissolved gas into the immiscible liquid. As discussed above, this can assist in wastewater treatment and treatment of selected materials by allowing for the formation of free radicals within the immiscible liquids and delivery of oxygen or other gases into the immiscible liquid that can assist in bioactivity of microbes and other compounds. For example, the transfer fluid 12 can be injected into a waste material or contaminate (e.g. crude oil) along with the addition of microbes and an emulsion can be formed. The emulsion can allow positioning of the micro-nanobubbles, including the selected gas (e.g. oxygen), to assist in the digestion of the waste material by the microbes.

Surface Cleaning

With reference to FIG. 5 a stream from the nozzle 24 could be directed at a surface 200 that has been contaminated with a contaminate material 202. The surface 200 can include inanimate or non-living surfaces including a sea wall, a boat hull, a land mass, plant life, etc. Additionally, the surface can include animate or living surfaces such as those of animal wildlife (e.g. birds, reptiles, and mammals) and all varieties of vegetation. As discussed above, the generation of the micro-nanobubbles with the nozzle 24 can be done with a plurality of flow rates and velocities. Thus, the force of impingement on the surface 200 can be tailored for the surface 200, such as a soft and fragile surface or a hard and sturdy surface.

In a test, eight light-colored granite rocks, 5-10 cm in diameter, were covered with used Valvoline® high grade synthetic motor oil. The used motor oil could not be washed off the surface of the rocks with a conventional water jet. However, directing the transfer fluid 12 consisting of water supersaturated with oxygen at 0.5 ml $O_2$/ml water, via an 8 in. long, 0.875 mm constant internal diameter stainless steel tube (liquid flow=600 ml/min.) in air against the rocks was successful in removing substantially all of the visible indications of the used motor oil on the rock without the use or any other additives, such as a detergent. The used motor oil that was removed was observed to form an emulsion in the water, facilitating subsequent removal of the used motor oil from the surface of a plastic wash basin.

The contamination material could be oil (e.g. crude or refined oil), fuel, adhesives, etc. The nozzle 24 could be attached to a manually operated mechanism, such as including a trigger 204 that could be operated by a user 206. Alternatively, a remote manifold could be used to allow flow of the transfer fluid through the nozzle 24 to direct the transfer fluid 12 towards the surface 200.

Impingement of the transfer fluid 12 on the contaminate material and the surface 200 could immediately help remove the contaminate material 202 from the surface 200. Transformation of the contaminate material 202 into a fine emulsion, as discussed above, along with expansion of gas filled micro-nanobubbles within the emulsion helps to lift the contaminate material 202 off the surface 200.

When directing the stream of the transfer fluid 12 through air the sudden impact of the stream of the transfer fluid 12 against the surface 200 results in a very rapid expansion of micro-nanobubbles. The abrasive action of the transfer fluid 12, the explosive release of micro-nanobubbles, and the creation of a fine emulsion all help to clean the contaminate material 202 from the surface 200. The emulsification can include micro-nanobubbles emulsified in the contaminate material 202 after impingement with the transfer fluid 12.

No surfactant is required to emulsify the contaminate material 202. Some surfactants can be harmful to both the object to be treated and the surrounding environment. Thus, the emulsification and removal of the contaminate material 202 without the use of any surfactants (e.g. soaps and detergents) can assist in minimizing environmental impact in addition to the contaminate material 202.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of treating a receiving volume of a first liquid, comprising:
    saturating a transfer liquid with a gas at a pressure of at least 6 bar in a containment vessel;
    releasing the transfer liquid from the containment vessel;
    passing the released transfer liquid from a first end through an elongated tube having a substantially constant internal diameter and out a second end;
    generating a Reynolds number in the effluent from the tube in a range from about 2,220 to about 100,000; and
    generating a population of micro-nanobubbles in a receiving liquid due at least to the generated Reynolds number, the generated population of micro-nanobubbles having an average diameter that is about 50 microns or less in the receiving volume of the first liquid.

2. The method of claim 1, further comprising:
    adding at least one of a microbe, an enzyme, or a nutrient to the receiving volume of the first liquid to degrade a contaminate in the receiving volume of the first liquid.

3. The method of claim 2, wherein the receiving volume of the first liquid is immiscible with the transfer liquid, and further comprising:
    forming an emulsion of the receiving volume of the first liquid and the transfer liquid to provide the gas within a portion of the receiving volume of the first liquid.

4. The method of claim 1, wherein the Reynolds number generated is between about 5,000 and about 50,000.

5. The method of claim 4, further comprising:
    selecting the Reynolds number based on selecting at least one of a characteristic of the tube selected from a group consisting of an internal diameter of the tube; a length of the tube, a flow rate of the transfer liquid in the tube, a material of an internal wall of the tube, and a viscosity of the transfer fluid.

6. The method of claim 4, wherein generating micro-nanobubbles includes generating bubbles having an average diameter of less than about 20 microns.

7. The method of claim 6, wherein generating micro-nanobubbles includes generating bubbles having an average diameter that is substantially only visible when transluminated by an argon ion laser.

8. The method of claim 1, further comprising:
    forming the tube of stainless steel having the substantially constant internal diameter of greater than about 0.5 mm and less than about 2.0 mm.

9. A method of injecting of gas filled bubbles into a liquid, comprising:
    spraying an aqueous liquid into a vessel pressurized to at least 8 bar with gas to create an gas-enriched first liquid;
    passing the gas-enriched first liquid through a delivery tube that has a substantially constant internal diameter and is elongated from a proximal end and out a distal end; and
    piercing a second liquid with the passed gas-enriched first liquid as a liquid lance having a density at the distal end of the delivery tube substantially similar to the density of the aqueous liquid.

10. The method of claim 9, wherein the second liquid is selected from a group consisting of a water-miscible liquids, water-immiscible liquids, or a mixture of water-miscible and water-immiscible liquids.

11. The method of claim 10, wherein an emulsion of gas micro-nanobubbles having an average diameter of less than about 50 microns within the second liquid is produced.

12. The method of claim 11, wherein the stability of the emulsion of immiscible liquids is increased by injection of the gas-enriched first liquid into the second liquid.

13. The method of claim 11, further comprising:
    adjusting a flow velocity of the gas-enriched first liquid is adjusted passing through the delivery tube to control the size and growth of bubbles injected into or formed within the second liquid.

14. The method of claim 9, wherein spraying an aqueous liquid into a vessel includes spraying a fraction of the second liquid.

15. The method of claim 9, where the gas is selected from a group consisting of oxygen, air, nitrogen, carbon monoxide, carbon dioxide, methane, ethane, hydrogen, helium, and argon.

16. The method of claim 9, wherein the tube includes a plurality of tubes and piercing the second liquid with the gas-enriched first liquid through the plurality of tubes positioned in a manner that limits the entrainment of exiting aqueous liquid from the adjacent tube.

17. The method of claim 1, further comprising:
    forming the elongated tube to have the substantially constant internal diameter from the first end to the second end of about 0.8 mm.

18. The method of claim 17, further comprising:
    forming the tube to have only a first opening at the first end and only a second opening at the second end;
    wherein the released transfer liquid is passed out the second opening at the second end.

19. The method of claim 1, further comprising:
    forming the tube to have a length from the first end to the second end of at least about 13 centimeters.

20. The method of claim 17, wherein passing the released fluid occurs at least at about the gas pressure of at least 6 bar.

21. The method of claim 9, further comprising:
    forming the delivery tube to have the substantially constant internal diameter from the proximal end to the distal end of about 0.8 mm.

22. The method of claim 9, further comprising:
    forming the delivery tube to have a length from the proximal end to the distal end of at least about 13 centimeters.

* * * * *

UNITED STATES PATENT AND TRADEMARK OFFICE
CERTIFICATE OF CORRECTION

| | | |
|---|---|---|
| PATENT NO. | : 8,500,104 B2 | Page 1 of 1 |
| APPLICATION NO. | : 12/795362 | |
| DATED | : August 6, 2013 | |
| INVENTOR(S) | : James Richard Spears et al. | |

It is certified that error appears in the above-identified patent and that said Letters Patent is hereby corrected as shown below:

In the Specification

Column 6, Line 53; Delete "22" and insert --20--.

Column 7, Line 41; Delete "103" and insert --103a--.

Column 10, Line 31; Delete "10" and insert --12--.

Column 12, Line 64; Before "the", insert --to--.

Column 13, Line 17; Before "micron", insert --20--.

Column 15, Line 30; Delete "liquid" and insert --fluid--.

Column 16, Line 40; Delete "and" and insert --an--.

Column 17, Line 3; Delete "carrier" and insert --transfer--.

Column 17, Line 13; Delete "152" and insert --150--.

Column 17, Line 14; Delete "154" and insert --152--.

Column 17, Line 15; Delete "154" and insert --152--.

In the Claims

Column 20, Lines 22 - 23, Claim 13, after "liquid", delete "is adjusted".

Signed and Sealed this
Twenty-sixth Day of August, 2014

Michelle K. Lee
*Deputy Director of the United States Patent and Trademark Office*